United States Patent [19]

Bobbin

[11] 4,195,168

[45] Mar. 25, 1980

[54] METHOD OF TREATING SUSPENSIONS OF VINYL CHLORIDE/VINYL ACETATE COPOLYMERS

[75] Inventor: Eldred G. E. Bobbin, St. Neots, England

[73] Assignee: Imperial Chemical Industries Limited, London, England

[21] Appl. No.: 893,273

[22] Filed: Apr. 5, 1978

[30] Foreign Application Priority Data

Apr. 19, 1977 [GB] United Kingdom ............... 16170/77

[51] Int. Cl.$^2$ ................................................. C08F 6/10
[52] U.S. Cl. ............................ 528/495; 260/29.6 ME; 528/494
[58] Field of Search .................. 260/29.6 E, 29.6 ME; 528/495

[56] References Cited

U.S. PATENT DOCUMENTS 4,015,064  3/1977  Feldman ............................... 528/495

Primary Examiner—Paul R. Michl
Attorney, Agent, or Firm—Cushman, Darby & Cushman

[57] ABSTRACT

A method of treating an aqueous suspension of a granular copolymer of vinyl chloride and vinyl acetate which is produced from a copolymerization reaction between the monomers in aqueous suspension in which method, after the end of the copolymerization reaction, the pressure in a vessel containing the aqueous suspension is released by venting and the suspension is then heated in a vessel under conditions of temperature and pressure such that there is a vaporous outflow of water vapor, residual vinyl chloride and residual vinyl acetate from the vessel, wherein there is added to the aqueous suspension, before the start of said heating and preferably before venting but after the end of the copolymerization reaction, an effective amount of at least one steam-volatile phenol such that polymerization of the outflowing vinyl acetate is substantially prevented. The preferred phenol is 2,6-ditertiary-butyl-4-methyl-phenol.

4 Claims, No Drawings

METHOD OF TREATING SUSPENSIONS OF VINYL CHLORIDE/VINYL ACETATE COPOLYMERS

The present invention relates to a method of treating an aqueous suspension of a copolymer of vinyl chloride and vinyl acetate.

It is well known to produce granular copolymers of vinyl chloride and vinyl acetate by copolymerisation of the monomers in aqueous suspension. After the conversion of most of the monomers to copolymer, hereinafter referred to as the end of the copolymerisation reaction, there is normally a considerable quantity of unreacted monomers remaining in the polymerisation reaction vessel which imparts a superatmospheric pressure therein. This pressure is released by venting off the vapours, optionally with the application of reduced pressure, in a vessel containing the aqueous suspension (the suspension often being kept at the temperature employed for the polymerisation reaction); this vessel may be the reaction vessel itself or another vessel to which the suspension has been transferred without pressure release.

The venting operation removes the bulk of the residual monomers, or at any rate the bulk of the residual vinyl chloride (which is very much more volatile than vinyl acetate), in the vessel. Nevertheless there is still a significant amount of vinyl chloride and vinyl acetate associated with the aqueous suspension, even after venting. In view of the toxic nature of vinyl chloride and the possibility of residual vinyl acetate deleteriously affecting the quality of products fabricated from the copolymer, it is desirable that the vinyl chloride copolymer should ultimately contain as little residual vinyl chloride and vinyl acetate as possible.

It has been proposed to remove most of the residual vinyl chloride and vinyl acetate left after venting by heating the aqueous suspension (using a batch or a continuous process) in a vessel (often the polymerisation vessel, although another vessel may be employed) under conditions of temperature and pressure such that there is a vaporous outflow of water vapour, residual vinyl chloride and residual vinyl acetate from the vessel. For example, the suspension may be heated at an elevated temperature, with the vessel interior being maintained at atmospheric pressure or under reduced pressure by the operation of a vacuum pump in connection therewith. The elevated temperature may for example be achieved by the use of a surrounding heating jacket and/or by bubbling a hot gas such as steam through the suspension, the temperature and pressure conditions may be such that the aqueous suspension boils during this treatment (i.e. the suspension may boil at atmospheric pressure or under reduced pressure). By an elevated temperature is often meant a temperature of at least 5° C. above the polymerisation temperature, this temperature if often at least 75° C. and usually at least 80° C.

The mixture of water vapour, vinyl chloride and vinyl acetate in such a technique has of course to pass through one or more outflow gas lines in order for it to be conveyed away from the vessel containing the aqueous suspension. The lower boiling constituents of the mixture are normally separated in one or more vessels upstream of the vacuum pump, for example the water and vinyl acetate vapours may be condensed to form a two-layer condensate which can be removed and the layers separated, while the vinyl chloride may pass through the system, including the vacuum pump, to a gas holder. It is found, however, that the vinyl acetate while passing through the outflow gas line and condenser, has a tendency to undergo further polymerisation. This frequently causes blockages in the outflow gas line and condenser. Some vinyl acetate also gets carried over into the vacuum pump and may cause a blockage in that as well. As a result of such blockages, reactors may have to be put out of action until the blockages are removed, resulting in an unwelcome loss of productivity.

We have now invented a process wherein the above-mentioned problem is eliminated.

According to the present invention there is provided a method of treating an aqueous suspension of a granular copolymer of vinyl chloride and vinyl acetate which is produced from a copolymerisation reaction between the monomers in aqueous suspension in which method, after the end of the copolymerisation reaction, the pressure in a vessel containing the aqueous suspension is released by venting and the suspension is then heated in a vessel under conditions of temperature and pressure such that there is a vaporous outflow of water vapour, residual vinyl chloride and residual vinyl acetate from the vessel, wherein there is added to the aqueous suspension, before the start of said heating and preferably before venting but after the end of the copolymerisation reaction, an effective amount of at least one steam-volatile phenol such that polymerisation of the outflowing vinyl acetate is substantially prevented.

By an aqueous suspension of a granular copolymer of vinyl chloride and vinyl acetate is meant an aqueous slurry, i.e. a suspension in which the copolymer granules sediment in the absence of applied agitation.

The phenol for use according to the invention may be phenol itself or a substituted phenol and must be steam-volatile. Preferred steam-volatile phenols for use according to the method of the invention include 2,6-ditertiarybutyl-4-methyl-phenol; 2,6-ditertiarybutyl-4-methoxy-phenol and 2,4-dimethyl-6-tertiarybutyl-phenol.

It is found that the addition of at least one steam-volatile phenol according to the invention substantially inhibits any polymerisation of vinyl acetate in the outflow gas lines and any vessels or separating devices in connection therewith. The phenol is carried over with the vinyl acetate vapour. For example it is detected in a significant amount in any vinyl acetate condensate. The presence of the phenol with the vinyl acetate in the outflow gas line prevents any polymerisation in the line.

The copolymer granules in the aqueous suspension will tend to absorb a certain amount of the phenol which will then not be available for carry-over with the vinyl acetate. By an effective amount of phenol is meant an amount which can provide a sufficient quantity for carry-over with the vinyl acetate so as to prevent polymerisation thereof after satisfying the absorbtion demand of the vinyl chloride copolymer granules. In general, a lower limit of 10 parts per million (ppm), based on the total weight of monomers (i.e. vinyl chloride plus vinyl acetate) initially charged to the reaction medium, is sufficient for most grades of copolymer. The upper limit is not critical but should preferably not exceed 1000 ppm on the grounds of cost and also because of the possibility of poisoning the vinyl chloride removed from the outflow gas lines and because of the possibility of inhibiting subsequent polymerisation reactions that are carried out in the same reactor. The preferred amount of phenol to add is 100 to 500 ppm.

It is found that adding a phenol according to the method of the invention in consecutive polymerisations in the same reactor does not, unless extremely large quantities are employed, incur a build-up or "memory" of the phenol in the reactor so as to cause a lengthening of polymerisation time. This might have been expected to be a problem but does not in fact occur. Also the presence of some of the phenol in the resulting copolymer does not deleteriously effect the properties thereof; in fact the presence of a small quantity of the phenol may improve the thermal stability of the copolymer.

The phenols used in the method of the invention are often solid substances and in such cases they are preferably injected as a solution in acetone or chloroform or other suitable solvent. If the phenol is a liquid, it may be injected as such.

The method of the invention is usefully applied to the preparation of copolymers containing 0.5–25%, typically 2–25% by weight of polymerised vinyl acetate. Those polymers containing greater than 25% of polymerised vinyl acetate are little used commercially while the preparation of those containing less than 0.5% by weight of polymerised vinyl acetate will not normally incur the problem of vinyl acetate polymerisation in the outflow gas lines. The most commercially significant copolymers to which the method of the invention may be applied are those containing 8–20% of polymerised vinyl acetate particularly those containing 10–15% by weight of polymerised vinyl acetate.

The present invention is now illustrated by the following Examples. Unless otherwise specified all parts and percentages are by weight.

EXAMPLES 1–8

These Examples all employed a vinyl chloride/vinyl acetate copolymerisation, designed to provide a copolymer containing 10% by weight of polymerised vinyl acetate, carried out in aqueous suspension on a small scale (reactor capacity about 5 liters) using 100 parts vinyl chloride, 12 parts vinyl acetate, 243 parts water, a suspension agent system comprising partially hydrolysed polyvinyl acetate (0.15% based on vinyl chloride), diethyl peroxydicarbonate as initiator (0.10% on the vinyl chloride plus vinyl acetate charged) and a polymerisation temperature of 60° C. Polymerisation was carried out until well into the pressure-drop region (the pressure reaching about 70 psi in each pase) when 2,6-ditertiarybutyl-4-methyl-phenol was added in amounts as shown in Table 1 (corresponding to Examples 1–8). The phenol was added as a solution in 10 ml acetone in each case. The reactor was vented in each case and samples of the vented gases were collected. No trace of the phenol was detected (using ultra-violet spectroscopy) in any Example. Samples of the vented slurries were heated at 80° C. for 45 minutes under a pressure of 355 mm so as to cause an outflow of water vapour, vinyl chloride and vinyl acetate. The vinyl acetate and water vapour released were condensed in each run, the condensate separating into a vinyl acetate layer and a water layer. A sample of condensate containing approximately 500 ml water and 10 ml vinyl acetate was collected in each run and the amount of phenol in the water layer and in the vinyl acetate layer determined. The amount of phenol in the copolymer after drying was also determined. The results are shown in Table 1.

It can be seen that in Examples 2–8 there was considerable carry-over of the substitued phenol with the vinyl acetate, with a significant proportion of the phenol being absorbed on the copolymer granules. These experiments show that a phenol used according to the invention will be carried over with the vinyl acetate under the conditions defined so that any vinyl acetate polymerisation in the outflow gas line will be suppressed. In Example 1 (not employing any phenol) the outflow gas line to the condenser was coated with a skin of vinyl acetate polymer while in Examples 2–8 (employing the phenol) the outflow gas line was entirely clear of any build-up of polymer.

EXAMPLES 9–17

A series of polymerisations using the same procedure as that of Examples 2–8, except that 200 ppm of the substituted phenol were added in each case, were carried out successively in the same reactor. The reaction time for each polymerisation (i.e. the time taken to reach about 70 psi in the pressure-drop region) is shown in Table 2.

It can be seen from Table 2 that there is no cumulative retarding effect due to the addition of a phenol according to the invention.

TABLE 1

| Ex. No. | Amount phenol injected (ppm) based on wt. of vinyl chloride and vinyl acetate charged | Amount phenol in vinyl acetate layer of condensate (ppm) | Amount phenol in water layer of condensate (ppm) | Amount phenol in copolymer (ppm) based on dry weight of copolymer | Polymerisation Time |
|---|---|---|---|---|---|
| 1 | 0 | 0 | 0 | 0 | 3.2 |
| 2 | 1000 | 3400 | not measured | not measured | 2.2 |
| 3 | 500 | 900 | >0 <50 | 470 | 5.5 |
| 4 | 400 | 600 | >0 <50 | 280 | 1.7 |
| 5 | 200 | 200 | >0 <50 | 110 | 2.7 |
| 6 | 100 | 50 | >0 <50 | 70 | 6.3 |
| 7 | 50 | >0 <50 | >0 <50 | 80 | 2.0 |
| 8 | 10 | >0 <50 | >0 <50 | 30 | 5.0 |

TABLE 2

| Ex. No. | Reaction Time (hrs) (to reach about 70 psi pressure) |
|---|---|
| 9 | 2.0 |
| 10 | 2.0 |
| 11 | 3.7 |
| 12 | 2.0 |
| 13 | 3.7 |
| 14 | 2.4 |
| 15 | 2.0 |
| 16 | 2.0 |
| 17 | 2.0 |

EXAMPLES 18, 19

A series of polymerisations were carried out on a substantially larger scale than the polymerisations of Examples 1 to 17. The polymerisation recipe employed was essentially as for Example 1, although some of the copolymers made contained 10% by weight of polymerised vinyl acetate and others 15% by weight of polymerised vinyl acetate, and the recipe was suitably scaled up (or otherwise adjusted) for the larger scale operation. In some of these polymerisations (Example 18) 200 ppm of 2,6-ditertiarybutyl-4-methyl-phenol in acetone (25-30% solution) were injected into the reactor before venting. In other polymerisations (Example 19) the phenol injection was omitted.

In all of the polymerisations employing the injection of the phenol, the outflow gas lines were entirely clear, significant quantities of the phenol being detected in the recovered vinyl acetate. In most of the polymerisations omitting the injection of the phenol, significant formation of vinyl acetate polymer was incurred in the outflow gas lines, in some cases being sufficient to cause a complete blockage.

I claim:

1. A method of treating an aqueous suspension of a granular copolymer of vinyl chloride and vinyl acetate which is produced by copolymerizing vinyl chloride and vinyl acetate in an aqueous suspension wherein the pressure of a vessel containing the aqueous suspension is released by venting and the suspension is then heated at a temperature and pressure sufficient to effect a vaporous outflow, from the suspension, of water vapor, residual vinyl chloride and residual vinyl acetate, after the copolymerization is completed; and wherein said treating comprises adding to the aqueous suspension, after the end of the copolymerization but before said heating, an amount of at least one steam-volatile phenol selected from 2,6-ditertiarybutyl-4-methyl-phenol; 2,6-ditertiarybutyl-4-methoxy-phenol; and 2,4-dimethyl-6-tertiarybutyl-phenol which amount of phenol is sufficient to satisfy the absorption capacity of the copolymer granules and still provide a sufficient residual quantity thereof for carry-over with the residual vinyl acetate, substantially to prevent any polymerization of the residual vinyl acetate in the outflow as a result of the presence of the phenol with the vinyl acetate, the amount of phenol added being 10 to 1000 ppm based on the total weight of monomers initially charged.

2. A method according to claim 1 wherein said phenol is added to the aqueous suspension before venting.

3. A method according to claim 1 wherein the amount of phenol is 100 to 500 ppm based on the total weight of monomers initially charged.

4. A method according to claim 1 wherein the copolymer prepared contains 0.5 to 25% by weight of polymerised vinyl acetate.

* * * * *